United States Patent
Isaji

(10) Patent No.: US 7,173,561 B2
(45) Date of Patent: Feb. 6, 2007

(54) RADAR DEVICE CAPABLE OF SCANNING RECEIVED REFLECTION WAVES

(75) Inventor: Osamu Isaji, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 10/778,517

(22) Filed: Feb. 12, 2004

(65) Prior Publication Data

US 2004/0246168 A1    Dec. 9, 2004

(30) Foreign Application Priority Data

Jun. 9, 2003    (JP)    ............................. 2003-164122

(51) Int. Cl.
*G01S 7/28*    (2006.01)
(52) U.S. Cl. .................. 342/70; 342/107; 342/146
(58) Field of Classification Search .................. 342/70
See application file for complete search history.

(56) References Cited

U.S. PATENT DOCUMENTS

| | | | | |
|---|---|---|---|---|
| 3,868,695 A * | 2/1975 | Kadak | .......................... | 343/778 |
| 4,686,532 A | 8/1987 | McAulay | | |
| 4,924,235 A * | 5/1990 | Fujisaka et al. | ............. | 342/374 |
| 5,008,678 A * | 4/1991 | Herman | ........................ | 342/158 |
| 5,412,414 A | 5/1995 | Ast et al. | | |
| 5,657,027 A * | 8/1997 | Guymon, II | .................. | 342/445 |
| 5,717,399 A | 2/1998 | Urabe et al. | | |
| 5,767,793 A * | 6/1998 | Agravante et al. | ........... | 340/903 |
| 5,955,991 A | 9/1999 | Kawakubo | | |
| 5,995,062 A | 11/1999 | Denney et al. | | |
| 6,067,048 A * | 5/2000 | Yamada | ........................ | 342/382 |
| 6,288,672 B1 | 9/2001 | Asano et al. | | |
| 6,292,129 B1 | 9/2001 | Matsugatani et al. | | |
| 6,292,135 B1 * | 9/2001 | Takatori et al. | .............. | 342/383 |
| 6,337,656 B1 * | 1/2002 | Natsume et al. | ............. | 342/149 |

(Continued)

FOREIGN PATENT DOCUMENTS

EP    0 707 220 A2    4/1996

(Continued)

OTHER PUBLICATIONS

English Patent Abstracts of Japan of corresponding unexamined patent Publication No. JP-A-63-256879.

(Continued)

*Primary Examiner*—Thomas H. Tarcza
*Assistant Examiner*—Matthew Baker
(74) *Attorney, Agent, or Firm*—Christie, Parker & Hale, LLP

(57) ABSTRACT

The present invention relates to a radar device for forming multi-beams in multiple channels from reflected waves of a transmitted wave by using a minimum number of antennas. The device has: antennas used for both transmission and reception A1–A4; transmission/reception switching means 5 of each antenna; a transmitter 2; and a receiver 4 for receiving the reflected waves of the transmitted wave. The ratio of the distance between adjacent antennas A1 and A2 to the distance between adjacent antennas A2 and A3 or A3 and A4 is 1:2. The transmitted signal is transmitted from each of the antennas selected sequentially and the received signal is processed by DBF in a signal processing controller 1, wherein eleven channels can be implemented by using four antennas and a space for six antennas.

17 Claims, 11 Drawing Sheets

U.S. PATENT DOCUMENTS

| | | |
|---|---|---|
| 6,445,339 B1 | 9/2002 | Yamada |
| 6,573,859 B2 * | 6/2003 | Tokoro .................. 342/70 |
| 2002/0012289 A1 | 1/2002 | Gilbert et al. |
| 2003/0052813 A1 * | 3/2003 | Natsume .................. 342/70 |

FOREIGN PATENT DOCUMENTS

| | | |
|---|---|---|
| EP | 0 707 220 A3 | 4/1996 |
| EP | 0 898 174 A1 | 2/1999 |
| EP | 0 919 828 A2 | 6/1999 |
| EP | 0 919 828 A3 | 6/1999 |
| EP | 1 486 796 A2 | 12/2004 |
| JP | 7-120547 | 5/1995 |
| JP | 7120547 | 5/1995 |
| JP | 11-160423 | 6/1999 |
| JP | 2000-155171 | 6/2000 |
| JP | 11-311668 | 9/2002 |
| JP | 2003-248055 | 9/2003 |

OTHER PUBLICATIONS

European Patent Office Search Report (partial), dated Dec. 16, 2004, for Application No. 04250793.9, in the name of Fujitsu Ten Limited.

Garrod, A, *Digital Modules for Phased Array Radar*, IEEE International Radar Conference, 1995, pp. 726-731, XP 000529148.

European Search Report dated Jul. 5, 2006 for EP 06005136.4, in the name of Fujitsu Ten Limited.

* cited by examiner

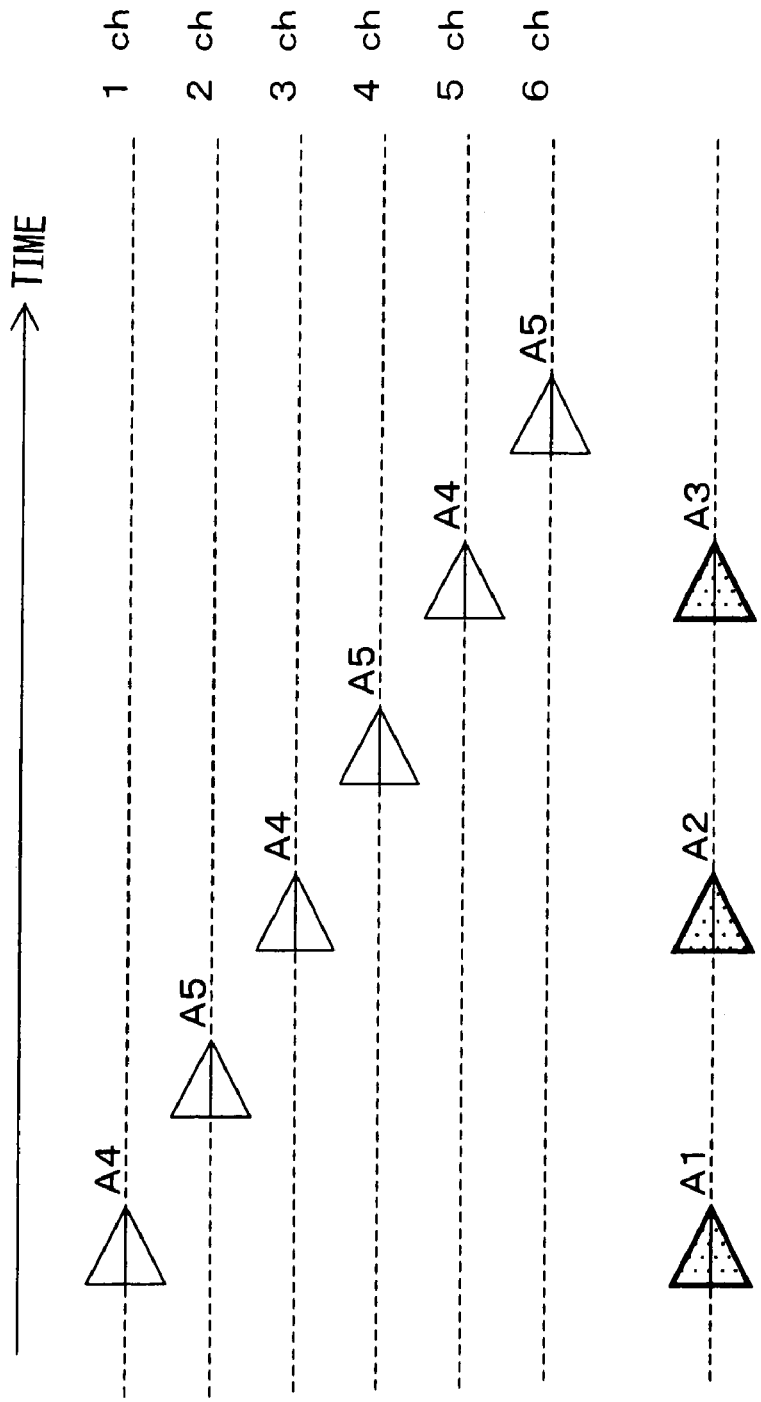

US 7,173,561 B2

RADAR DEVICE CAPABLE OF SCANNING RECEIVED REFLECTION WAVES

CROSS-REFERENCE TO RELATED APPLICATION

This application Claims the priority of Japanese Patent Application Number 2003-164122, filed on Jun. 9, 2003.

BACKGROUND OF THE INVENTION

1. Field of the Invention

The present invention relates to a radar device using a transmitted wave that is a frequency modulated continuous wave (FM-CW) and, in particular, it relates to a radar device that receives and scans reflection waves resulted from the transmitted electric wave by means of Digital Multi-beam Forming (DBF).

2. Description of the Related Art

It is well known that various radar devices for performing reception and scanning using DBF have been developed. Typically, the radar device of this type is basically provided with one transmitting antenna and a plurality of receiving antenna, wherein an electric wave is transmitted from the transmitting antenna and reflection waves resulted from the transmitted electric wave are received by the plurality of antennas.

However, the radar device of such configuration needs receivers, the number of which is equal to the number of the receiving antennas and, in order to improve scanning accuracy, many receivers must be provided. Therefore, there is a problem in that, as the number of the receivers is increased, the weight and size of the radar device is increased and a great deal of electric power is required.

Therefore, in order to solve this problem, radar devices intended for size and weight reduction are disclosed in, for example, Japanese examined patent publication (Kokoku) H06-68542, Japanese unexamined patent publication (Kokai) H11-311668, Japanese unexamined patent publication (Kokai) H11-160423 and so on. These radar devices are configured so that a plurality of antennas are connected to one receiver via a switch. Alternatively, a plurality of antennas are divided into several groups or, more specifically, for example, a receiving antenna array consisting of multiple receiving antennas is divided into receiving antenna groups, each of which includes four receiving antennas, and receivers are provided by one for every four receiving antennas so that the antennas in each group are connected to each corresponding receiver. In such configuration, when reflected waves of the transmitted electric wave are received, the plurality of receiving antennas are switched sequentially and connected to the receivers. This allows radar signals to be received by each antenna in a time division manner.

Such configuration can reduce the number of receivers corresponding to the plurality of antennas to one or a number that is less than the number of the plurality of antennas, which will result in reduction of the size and cost of the device.

In this connection, the electric wave used by the radar device is, for example, a high-frequency electric wave such as one in the 76 GHz band. This means that the signal that is processed in the transmission path from the receiving antennas to the receiver also has such a frequency. Typically, switches that can switch such high-frequency signals have only two or three inputs.

Therefore, when four or more antennas must be switched, a plurality of switches are used. For example, multiple switching can be implemented by combining unit switches having one input and two switched outputs (SPDT) or having one input and three switched outputs (SP3T) in a multistage manner. Here, the unitary switches may be planar circuit type high-frequency switches such as MMIC (microwave monolithic integrated circuits) or HIC (hybrid integrated circuits).

However, when the switches are connected in a multistage manner, there is a problem in that the signal is attenuated increasingly every time the signal passes each switch and, therefore, as the number of the receivers is reduced, the number of the switch stages is increased and the receiving sensitivity is degraded.

As a result, a radar device that has a relatively simple configuration and that can prevent the receiving sensitivity from being degraded is disclosed in, for example, Japanese unexamined patent publication (Kokai) 2000-155171. In the radar devices described above, one transmitting antenna corresponding to a plurality of receiving antennas is provided. In contrast, in the radar device shown in Japanese unexamined patent publication (Kokai) 2000-155171, a plurality of transmitting antennas is used in a switching manner so that the number of the receiving antennas and, thus, the number of the switches to switch the receiving antennas can be reduced. This configuration improves the receiving sensitivity and reduces the number of the antennas and switches, along with the cost of the device.

In this radar device, three transmitting antennas and two receiving antennas are connected to switching means and, in turn, a transmitter having an oscillator for outputting a high-frequency signal and a receiver are connected to the switching means. The receiver is synchronized with an oscillating signal from the oscillator and transmits received signals from the receiving antennas to a signal processing controller. Then, the signal processing controller performs signal processing for Digital Multi-beam Forming (DBF) based on the received signals and controls switching of the transmitting and receiving antennas in the switching means.

These transmitting and receiving antennas are aligned on an identical plane and in an identical straight line and the number of the antennas is less than that in the conventional radar devices. By configuring the radar device as described above, the radar device can be manufactured easily and with a reduced cost and, further, in applications such as a car-mounted radar device and the like, an entire radar device can be shaped so that it is suitable for being mounted on a vehicle.

In the radar device shown in Japanese unexamined patent publication (Kokai) 2000-155171 above, when the distance between the two receiving antennas is L, the three transmitting antennas are disposed so that each distance between the adjacent two transmitting antennas is 2 L.

In this connection, in other conventional radar devices, in order to equip the radar device with six receiving antennas and one corresponding receiver, the switch must have been in a two-stage configuration that is comprised of two switches having one input and three switched outputs and another one switch having one input and two switched outputs. In contrast, in the radar device shown in Japanese unexamined patent publication (Kokai) 2000-155171 above, a switch must be provided also at the transmitting side but one-stage switch suffices to switch between two receiving antennas.

Further, in this radar device, if it is desired to further increase the number of channels so as to reduce the directivity of the obtained beams, a receiving antenna having antenna characteristics identical to those of other receiving antennas is disposed additionally with a distance L. Then, the three transmitting antennas are disposed so that each distance between the adjacent two transmitting antennas is 3 L. In the radar device with such antenna configuration, if six antennas are used (i.e. three transmitting antennas, and two receiving antennas plus one added receiving antenna), three channels can be added and, thus, beams of nine channels can be obtained.

As described above, according to this radar device, the attenuation of the received signal in the switches can be reduced and, by using the antennas the number of which is less than that in the conventional radar device, a number of channels that is more than that of the antennas can be implemented.

Further, according to this radar device, the number of channels that is more than that of antennas can be implemented and beams with narrower directivity can be obtained. For example, in the case of nine channels, ten antennas, that have been needed in the conventional radar device, can be reduced to six. However, when the antennas are assembled in the radar device, the antennas are arranged side by side in a line. Because these six antennas are arranged so that each distance between the transmitting antennas is 2 L, a space for ten antennas is needed.

On the other hand, for example, when such a radar device is mounted on a car as one of various types of car-mounted electronic equipment, in order to assure that the electric wave is radiated toward the front of the car, the radar device must be mounted in a limited and narrow space. The radar device used in such an environment must be made as small as possible. Thus, even though the number of antennas could be reduced in the radar device described above, it would be insufficient in terms of size. Moreover, in view of recognition of objects in front of the car and safety of the car driving, there is a need for a radar device having higher performance and lower cost.

Thus, it is an object of the present invention is to provide a radar device that reduces the number of antennas for receiving and scanning reflected waves resulted from a transmitted electric wave by means of Digital Multi-beam Forming (DBF) and that can implement multiple channels with smaller size and higher performance as well as lower cost.

SUMMARY OF THE INVENTION

In order to solve the above problems, according to the present invention, there is provided a radar device that has a plurality of antennas and comprises a signal processing means for receiving reflected waves resulting from a transmitted electric wave and performing digital multi-beam forming based on the received signals, the radar device further comprising: a transmitter for transmitting said electric wave from at least one or more antennas selected from said plurality of antennas; and a receiver for receiving said reflected waves via each of said antennas.

Further, in order to switch said plurality of antennas between transmission and reception, the radar device further comprises: a first switch for supplying a transmitted signal of said electric wave from said transmitter to said selected antenna; and a second switch for switching and inputting received signals according to said reflected electric waves received by each of said antennas to said receiver sequentially, wherein all of said antennas are used for both transmission and reception. Further, said first switch switches said antennas sequentially and, in particular, it switches said antennas every cycle of said transmitted signal.

Still further, said antennas have identical antenna characteristics and said antennas are disposed in a straight line.

When one particular antenna is selected by said first switch and the electric wave is transmitted from the selected particular antenna, said second switch selects any of said antennas for receiving the reflected waves resulted from the selected particular electric wave and inputs said received signal to said receiver and, when a receiving channel in relation to the reflected waves according to the electric wave transmitted by the selected particular antenna and a receiving channel in relation to the reflected waves according to the electric wave transmitted by any antenna different from the selected particular antenna overlap each other, said second switch does not select reception of the particular antenna or, when a receiving channel in relation to the reflected waves according to the electric wave transmitted by the selected particular antenna and a receiving channel in relation to the reflected waves according to the electric wave transmitted by any antenna different from the selected particular antenna overlap each other, said receiver does not provide its output to said digital multi-beam forming means.

Further, said plurality of antennas are disposed in a single row with different distances between adjacent antennas, wherein said plurality of antennas are disposed so that the ratio of a distance between a given pair of adjacent antennas to a distance between another pair of adjacent antennas is 1:2, or said plurality of antennas include first to fourth antennas that are arranged sequentially, wherein a pair of said first and second antennas are disposed with a first distance, a pair of said second and three antennas and a pair of said third and fourth antennas are each disposed with a second distance, and said second distance is twice as long as said first distance.

Still further, said plurality of antennas are provided with respective transmitting ports and receiving ports, wherein each of said transmitting ports is connected to respective transmitters and each of said receiving ports is connected to respective receivers, or each of said transmitting ports is connected to a shared transmitter selectively and each of said receiving ports is connected to a shared receiver selectively.

Still further, each of said plurality of antennas is provided with a two-way switch for switching between transmission and reception, wherein said two-way switch connects the respective antenna to the transmitter when it is switched for said transmission and connects the respective antenna to the receiver when it is switched for said reception.

Transceivers corresponding to each of said plurality of antennas, in which the output ports of said transmitters and the receiving ports of said receivers are combined for both transmission and reception, are provided, wherein said transceivers are shared by each of said plurality of antennas and are selectively connected to each antenna for transmission or reception and, further, the number of said transceivers are less than that of said plurality of antennas and said transceivers are connected to said antennas and switched to transmission or reception in a time division manner.

Further, a voltage-controlled oscillator for supplying a reference signal to said transmitters and said receivers is provided, wherein said voltage-controlled oscillator is shared by each transmitter and each receiver in relation to said plurality of antennas.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 13 is a diagram for describing a receiving operation of the antennas in the radar device shown in FIG. 12.

DESCRIPTION OF THE PREFERRED EMBODIMENTS

In order to clarify the effect obtained by the present invention, first, a configuration of a radar device for receiving and scanning reflected waves resulted from a transmitted electric wave by means of Digital Multi-beam Forming (DBF) according to the prior art, to which the present invention is not applied, will be described specifically.

Figure 12:
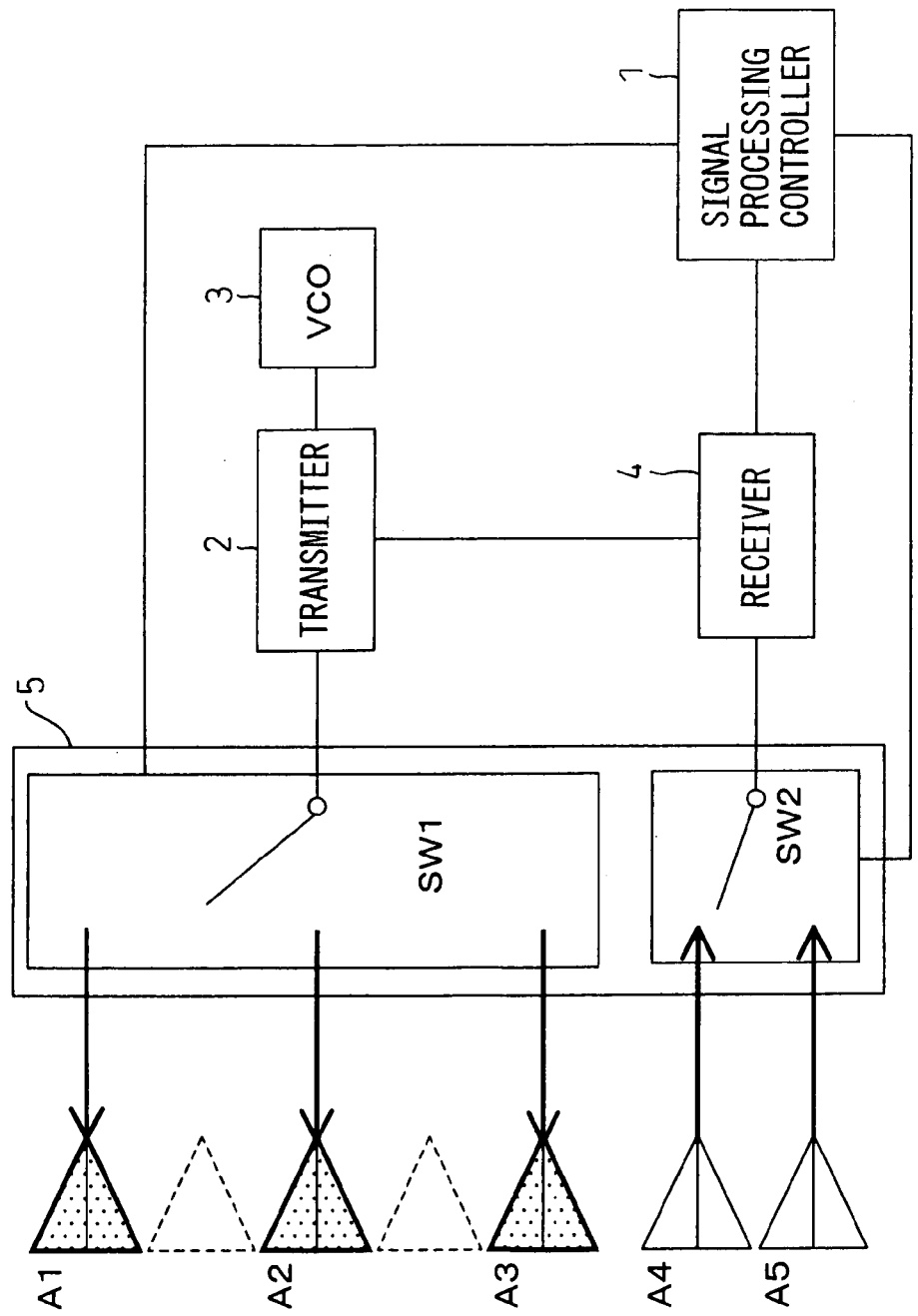
FIG. 12 is a schematic block diagram of a radar device according to the prior art.

A schematic block diagram of this radar device is shown in FIG. 12. In this radar device, three transmitting antennas A1, A2 and A3 and two receiving antennas A4 and A5 are connected to switching means 5 and to the switching means 5, in turn, a transmitter 2 having an oscillator 3 such as, for example, a voltage-controlled oscillator (VCO) that outputs a high-frequency signal in 76 GHz band and a receiver 4 are connected. The receiver 4 is synchronized with the oscillating signal from the oscillator 3 and transmits signals received from the receiving antennas to a signal processing controller 1. Then, the signal processing controller 1 performs signal processing for Digital Multi-beam Forming (DBF) based on the received signals and controls switching of the transmitting and receiving antennas in the switching means 5.

The oscillator 3 is connected to a switch SW1 at the transmitting side via a distributor of the transmitter 2 and supplies an oscillating output to the transmitting antennas. This switch SW1 has one input and three switched outputs (SP3T) and the three outputs are connected to the three transmitting antennas A1, A2 and A3. Thus, based on an instruction of the signal processing controller 1, the switch SW1 is switched so that a high-frequency signal is supplied from the oscillator 3 to the transmitting antennas A1, A2 and A3 in a time division manner. As a result, the high-frequency signal from the oscillator 3 is transmitted through the transmitting antennas A1, A2 and A3 sequentially in a time division manner. Here, the transmitting antennas A1, A2 and A3 have directivity equal to each other and can radiate electric waves over an entire detection area.

On the other hand, at the receiving side, the two receiving antennas A4 and A5 are provided. The switch SW2 at the receiving side is connected to these receiving antennas A4 and A5. This switch SW2 has one input and two switched outputs (SPDT) and the receiving antennas A4 and A5 are connected to the outputs of this switch. Further, the one input of this switch SW2 is connected to a mixer of the receiver 4. Thus, based on an instruction of the signal processing controller 1, the switch SW2 is switched so that received signals obtained by the two receiving antennas A4 and A5 are supplied to the receiver 4.

Then, FIG. 13 shows how the antennas are switched in the radar device shown in FIG. 12. In this radar device, when the distance between the receiving antenna A4 and the receiving antenna A5 is L, the transmitting antennas A1, A2 and A3 are disposed so that each distance between the adjacent transmitting antennas is 2 L. These transmitting antennas A1–A3 and receiving antennas A4 and A5 are aligned on an identical plane and in a straight line and the number of disposed antennas is less than that in the earlier radar device.

The electric wave transmitted by the transmitting antennas A1, A2 and A3 is reflected by an object and reaches the receiving antennas A4 and A5. Therefore, when the transmitting antennas are moved spatially, the same received signal should be obtained by parallel translation of the receiving antennas in the inverse direction in response to the movement of the transmitting antennas. Thus, the received signal of the receiving antennas A4 and A5 when the signal is transmitted from the transmitting antenna A2 is same as that when the transmitting antenna A2 is moved to the position of the transmitting antenna A1 and the receiving antennas A4 and A5 are parallel translated in the inverse direction by the distance L between the antennas A4 and A5. Further, the received signal of the receiving antennas A4 and A5 when the signal is transmitted from the transmitting antenna A3 is same as that when the transmitting antenna A3 is moved to the position of the transmitting antenna A1 and the received antennas A4 and A5 are parallel translated by 2 L.

With reference to FIG. 13 showing pairs of transmitting and receiving antennas in each time period along with the positional relationship of the antennas in the arrangement direction, it can be found that, by switching the switch SW1 and the switch SW2 appropriately, beams of six channels can be obtained using five antennas consisting of three transmitting antennas and two receiving antennas. It is equivalent to the device in which one transmitting antenna and six receiving antennas are disposed.

Thus, in other conventional radar devices, in order to equip the radar device with six receiving antennas and one corresponding receiver, the switch must have been in a two-stage configuration comprised of two switches having one input and three switched outputs and another one switch having one input and two switched outputs but, in contrast, in the radar device shown in FIG. 12, the switch SW1 must be provided also at the transmitting side but a one-stage switch SW2 suffices to switch between the receiving antennas A4 and A5.

Further, in the radar device shown in FIG. 12, if it is desired to further increase the number of channels so as to make smaller directivity of obtained beams, a receiving antenna A6 (not shown) having antenna characteristics identical to those of the receiving antennas A4 and A5 may be disposed additionally with a distance L and transmitting antennas A1, A2 and A3 may be disposed so that each distance between the adjacent two transmitting antennas is 3 L. In the radar device with such antenna configuration, three channels are added to the channels shown in FIG. 13 and beams of nine channels can be obtained by using six antennas.

As described above, according to the radar device of FIG. 12, the attenuation of the received signal in the switches can be reduced and, by using the antennas the number of which is less than that in other conventional radar device, a number of channels that is more than that of the antennas can be implemented.

Figure 1:
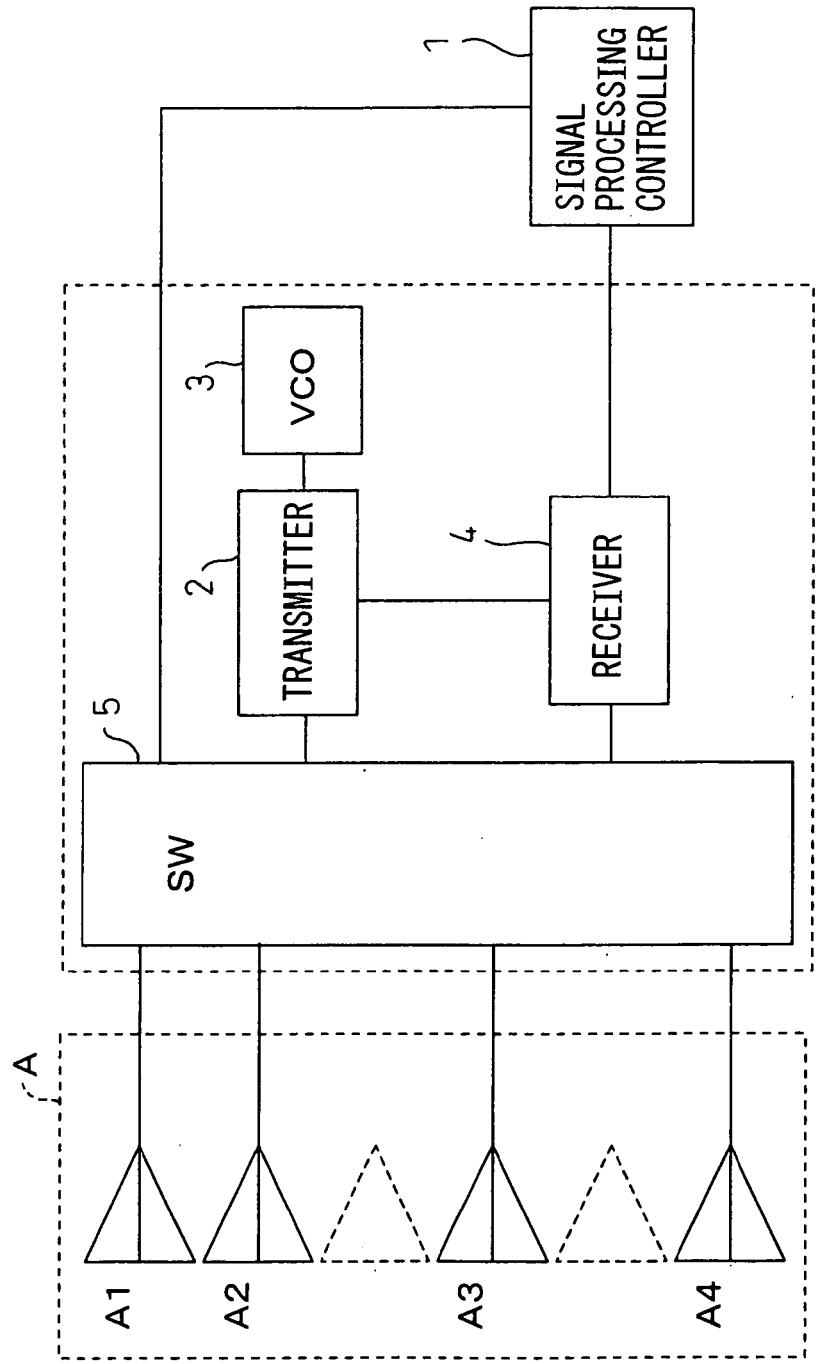
FIG. 1 is a schematic block diagram of a radar device according to an embodiment of the present invention.

Next, a radar device according to an embodiment of the present invention will be described with reference to figures. A schematic configuration of the radar device according to this embodiment is shown in FIG. 1. As the radar device shown in the figure is similar to the conventional radar device shown in FIG. 12 in that it basically receives and scans reflected waves resulted from a transmitted electric wave by means of Digital Multi-beam Forming (DBF) and, further, performs signal processing, in the radar device shown in FIG. 1, parts that are identical to those shown in FIG. 12 are designated by identical reference characters. In the figure, a high-frequency circuit part that is contained in a region encircled by broken lines and consists of a transmitter 2, a voltage-controlled oscillator (VCO) 3, a receiver 4 and switching means 5 is formed by a microwave monolithic integrated circuits (MMIC), just as in the conventional radar device.

In the radar device of FIG. 1, four antennas A1, A2, A3 and A4 form an antenna array A and are connected to the switching means 5. The transmitter 2 having the oscillator 3 such as, for example, a voltage-controlled oscillator (VCO) that outputs a high-frequency signal in 76 GHz band, and the receiver 4 that receives reflected electric waves resulted from the transmitted signal output by the transmitter and inputs the received signals, are connected to the switching means 5. The receiver 4 is synchronized with an oscillating signal from the oscillator 3 and transfers the received signals from the antennas to a signal processing controller 1. Then, the signal processing controller 1 controls switching between the four antennas A1–A4 by a switch SW in the switching means 5 and performs signal processing by means of Digital Multi-beam Forming (DBF) based on the received signals supplied from the receiver 4.

Here, the radar device of this embodiment differs significantly from the conventional radar devices in that, in the radar device of this embodiment, each of the plurality of antennas forming the antenna array A is not dedicated for either transmission or reception but one or more or all of a plurality of antennas are used for both transmission and reception, in contrast to the conventional radar device, in which each of a plurality of antennas forming an antenna array is dedicated for either transmission or reception. The plurality of antennas are switched appropriately by the switch SW either to transmit a signal from the transmitter 2 or to receive reflected electric waves resulted from the transmitted signal. Electric waves according to the transmitted signal are transmitted from the antennas that are selected sequentially and the reflected waves resulted from the transmitted electric waves are received and scanned by the plurality of antennas in a multi-channel manner.

Further, in contrast to the conventional radar device, in which the plurality of antennas are disposed equidistantly, the radar device of this embodiment is characterized in that distances between adjacent antennas are uneven. When the plurality of antennas are disposed equidistantly, even if the electric waves are transmitted from the antennas switched sequentially, the positions at which the corresponding reflected waves are received by the receiving antennas are shifted only by the distance between two antennas and, therefore, the advantage of switching the transmitting antennas sequentially is reduced and it becomes difficult to increase the number of channels. Therefore, the antennas are disposed so that the adjacent antennas are separated by either a longer or a shorter distance, wherein the longer distance is twice as long as the shorter distance. By disposing the antennas as described above, a larger number of channels can be obtained with a smaller number of antennas.

It is preferable that all antenna characteristics of the plurality of antennas used in the radar device of this embodiment such as, for example, directivity and gain are identical and the all antennas have directivity that can radiate electric waves over an entire detection area. The antennas are preferably disposed in a single row so that transmitting and receiving surfaces of the antennas are aligned in a straight line. If the antenna characteristics of the antennas are not even, an amount of computation to detect phases contained in the received signals will be increased, which may adversely affect the performance of the radar device.

FIG. 1 shows an example of the radar device provided with four antennas. A basic concept of Digital Multi-beam Forming (DBF) in this radar device will be described with reference to FIGS. 2 and 3. The DBF is performed in the signal processing controller 1 so that received signals from the antenna array A comprised of a plurality of antennas are A/D converted to digital signals and operations such as beam scanning, side-lobe adjustment and so on are implemented by digital signal processing.

Figure 2:
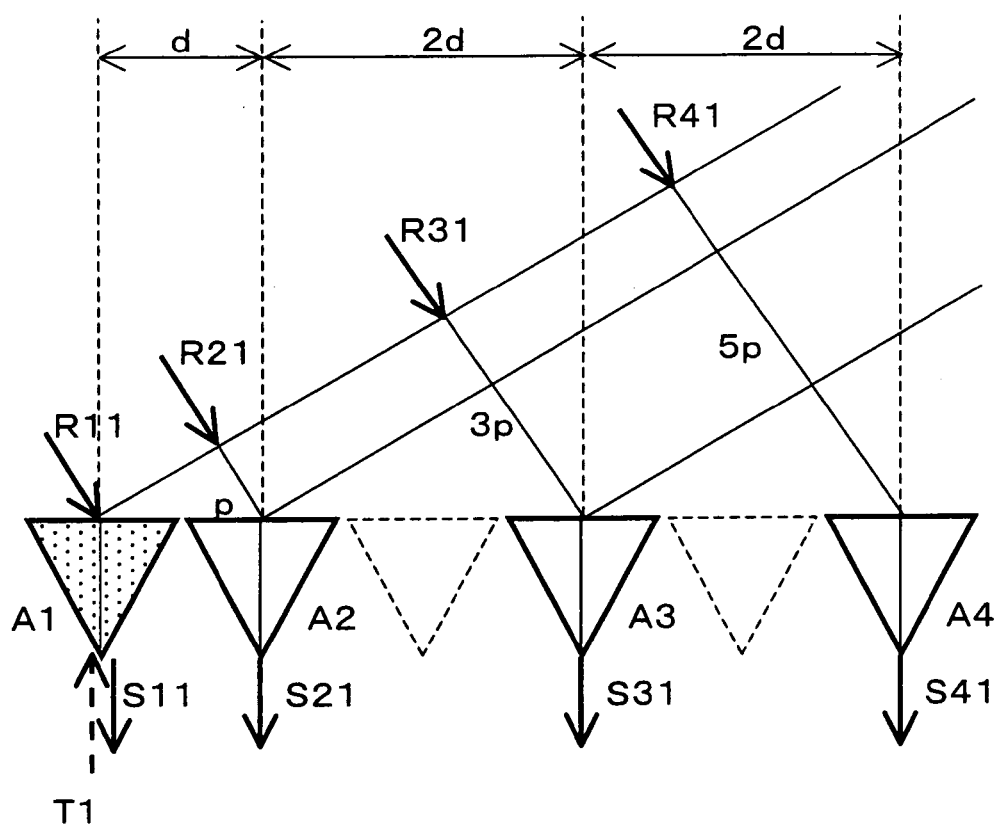
FIG. 2 is a diagram for describing an operating principle of antennas in the radar device according to this embodiment.

FIG. 2 shows the four antennas A1, A2, A3 and A4 provided in the radar device disposed side by side in a straight line. In this figure, four triangles indicate the disposed antennas. When the distance between the antennas A1 and A2 is d, each of the distance between the antennas A2 and A3 and the distance between the antennas A3 and A4 is 2 d, or twice as long as the distance d between the antennas A1 and A2. Here, in order to clarify how the antennas are disposed, triangles of broken lines are disposed between the antennas A2 and A3 and between the antennas A3 and A4 so as to indicate that each of the distance between the antennas A2 and A3 and the distance between the antennas A3 and A4 is 2 d, which is longer than the distance d by a width of one antenna.

As shown in FIG. 2, first, assume that the antenna A1 is selected first and an electric wave according to a transmitted signal T1 is transmitted from the antenna A1. The shaded triangle in the figure indicates the selected transmitting antenna to transmit the electric wave. The electric wave transmitted from the transmitting antenna A1 is reflected by an object and is returned to the antenna array A as reflected waves. The reflected waves approach at an angle θ with respect to the center direction of the radar and are received by the antenna array consisting of the four antennas A1, A2, A3 and A4 aligned as shown in the figure. With reference to the propagation path length of the reflected wave R11 corresponding to the antenna A1, each propagation path length of the reflected wave R21 corresponding to the antenna A2, the reflected wave R31 corresponding to the antenna A3, and the reflected wave R41 corresponding to the antenna A4 is longer than R11 by p (where p=d·sin θ), 3p and 5p, respectively.

Therefore, it can be found that the reflected wave R21, R31 and R41 reaching the antennas A2, A3 and A4, respectively are delayed from the reflected wave R11 reaching the antenna A1 correspondingly. When the wavelength of the reflected waves is λ, the amount of the delay is (2πd·sin θ)/λ, (6πd·sin θ)/λ and (10πd·sin θ)/λ, respectively. Thus, when the reflected waves R11, R21, R31 and R41 are received by the antennas A1, A2, A3 and A4, respectively, and received signals S11, S21, S31 and S41 are supplied to the receiver 4 via the switch SW, the reflected waves reach the corresponding antennas at different points in time and, therefore, phases of the received signal S21, S31 and S41 are delayed from a phase of the received signal S11 by (2πd·sin θ)/λ, (6πd·sin θ)/λ and (10πd·sin θ)/λ, respectively.

In the digital processing of the received signals by the signal processing controller 1, if phases of these received signals are advanced depending on the respective amounts of delay, it is equivalent to the reflected waves at the angle of θ being received by all of the antennas in an in-phase manner and all of the antennas have uniform directivity at the angle of θ.

Figure 3:
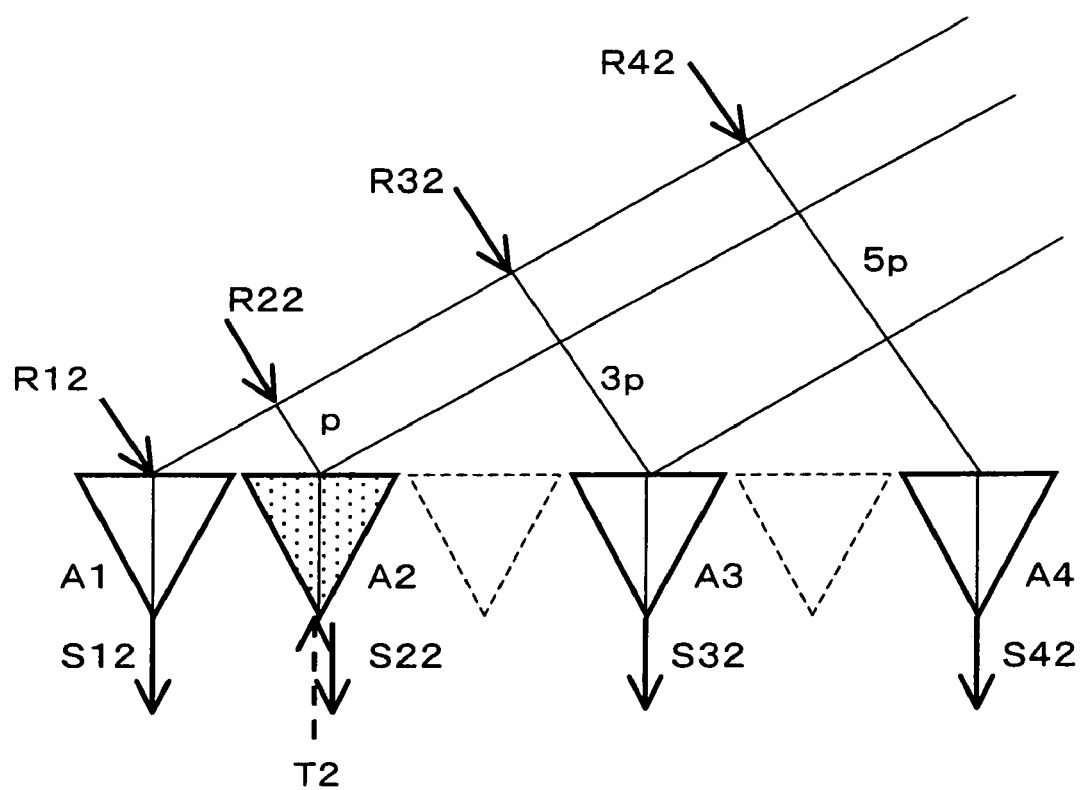
FIG. 3 is a diagram for describing a receiving operation of the antennas in the radar device according to this embodiment.

Next, as shown in FIG. 3, as the transmission is switched from the antenna A1 to the antenna A2, an electric wave according to a transmitted signal T2 is transmitted from the antenna A2. The electric wave transmitted from the transmitting antenna A2 is reflected by an object and is returned to the antenna array A as reflected waves. Similarly to FIG. 2, the reflected waves approach at the angle θ with respect to the center direction of the radar and are received by the antenna array A consisting of the four antennas A1, A2, A3 and A4.

The antennas A1, A2, A3 and A4 receive the reflected waves R12, R22, R32 and R42 corresponding to the transmitted signal T2, respectively. When the reflected waves R12, R22, R32 and R42 are received by the antenna A1, A2, A3 and A4, received signals S12, S22, S32 and S42 are supplied to the receiver 4 via the switch SW, respectively. Here, with reference to the propagation path length of the reflected wave R12 corresponding to the antenna A1, each propagation path length of the reflected wave R22 corresponding to the antenna A2, the reflected wave R32 corresponding to the antenna A3 and the reflected wave R42 corresponding to the antenna A4 is longer than R12 by p (where p=d·sin θ), 3p and 5p, respectively, as shown in the figure.

However, in the case of FIG. 3, in contrast to the case of FIG. 2, as the transmission is shifted from the antenna A1 to the antenna A2, received signals should be processed with reference to the point in time when the reflected wave arrives at the antenna A2. As a result, the positions where the reflected waves arrive at the antennas are shifted from those in the case of FIG. 2 according to the shift of the transmission from the antenna A1 to the antenna A2.

Thus, with reference to the received signal S22 according to the reflected wave R22 at the antenna A2, a phase of the received signal S12 at the antenna A1 leads by (2πd·sin θ)/λ and, on the other hand, phases of the received signals S32 and S42 according to the reflected waves R32 and R42 arriving at the antenna A3 and A4, respectively, are delayed from a phase of the received signal S22 at the antenna A2. The amount of the delay is (4πd·sin θ)/λ and (8πd·sin θ)/λ, respectively.

Therefore, in the digital processing of the received signals by the signal processing controller 1, if the phase of the received signal S12, which leads the receiving signal S22 by the amount noted above, is delayed accordingly and the phases of the receiving signals S32 and S42, which are delayed from the receiving signal S22 by the amount noted above, are advanced accordingly, it is equivalent to the reflected waves being received by all of the antennas in an in-phase manner and all of the antennas have uniform directivity at the angle of θ.

As described above, when an FM-CW wave is used as the transmitted signal, the transmission is switched among the antennas A1, A2, A3 and A4 sequentially every cycle of FM-CW triangular waves by controlling the switch SW provided in the radar device and, in the meanwhile, the FM-CW signal wave is transmitted by each antenna and the corresponding reflected waves are received by the antennas A1, A2, A3 and A4 in each cycle. According to this procedure, by transmitting the electric wave from any one of the antennas that are used for both transmission and reception and receiving the reflected waves resulted from the transmitted electric wave by the four antennas, eleven channels can be implemented by using a space for six antennas.

Figure 4:
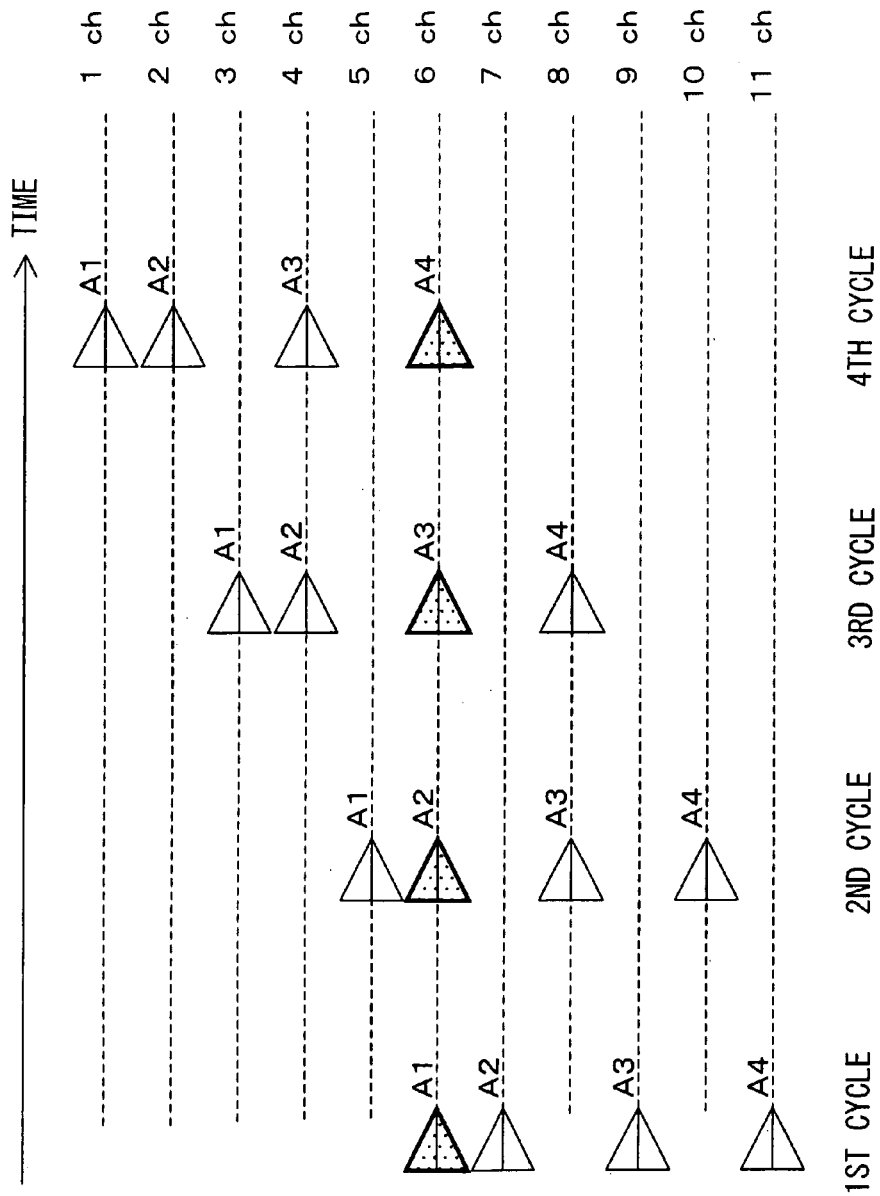
FIG. 4 is a diagram for describing an operation for switching between the antennas in the radar device according to this embodiment.

FIG. 4 shows receiving conditions of the four antennas when the eleven channels are implemented by the antenna array in which the four antennas are disposed in the space for six antennas. In this figure, the horizontal axis represents the time, triangles represent receiving antennas and, in particular, shaded triangles represent antennas used for both transmission and reception. Then, with reference to the transmitting antennas, the conditions of receiving channels implemented by the antennas are shown for every cycle of the FM-CW triangular wave.

Because each of the distance between the antenna A2 and the antenna A3 and the distance between the antenna A3 and the antenna A4 is twice as long as the distance between the antenna A1 and the antenna A2, in the first cycle of the FM-CW wave, the reflected waves are received by the antenna 1 in channel 6, by the antenna A2 in channel 7, by the antenna A3 in channel 9 and by the antenna A4 in channel 11.

In the second cycle of the FM-CW wave, as the transmission is shifted to the antenna A2 and the phase of the received signal at the antenna A2 is referenced, the positions where the reflected waves arrive at the antennas are virtually shifted from those in the first cycle by the distance d. As a result, in the second cycle, the reflected waves are received by the antenna A1 in channel 5, by the antenna A2 in channel 6, by the antenna A3 in channel 8 and by the antenna A4 in channel 10.

Further, as the transmission is switched to the antenna A3 in the third cycle and to the antenna A4 in the fourth cycle sequentially, the positions where the reflected waves arrive at the antennas are virtually shifted by the distance 2 d every cycle. Thus, also in the third and fourth cycles, similarly to the first and second cycles, the reflected waves are received by the antennas in the condition that the reflected waves are shifted by the distance 2 d. As a result, with reference to the antennas that transmit the electric wave in one rotation from the first cycle to the fourth cycle, the reflected waves in response to the transmitted electric wave are received by all channels from the channel 1 to the channel 11.

In this connection, though an overlap of the received signals found in the channel 6 is unavoidable because this channel is a reference channel in the case of FIG. 4, in each of the channels 4 and 8, either one of overlapping received signals is unnecessary. Here, in consideration of reduction of an amount of computation, the switch SW may be controlled to stop reception of either one of the overlapping signals or both overlapping signals may be received but the unnecessary signal may not be processed.

Further, though the four antennas are switched and selected as the transmitting antenna from the end of the antenna array sequentially in the example of FIG. 4, it is not necessary to select the antennas from the end of the antenna array but, even if the antennas are selected sequentially from the antenna in the middle of the antenna array, the eleven channels can be implemented similarly to the case when the antennas are selected from the end of the antenna array sequentially.

Though all of the four channels are selected for transmission to implement the eleven channels in the above description, in some circumstances, such strong directivity may not be needed. For example, when this radar device is mounted on a car and speed of the car is so fast that computing speed of the radar device cannot keep up with the movement, as an object approaches, an amount of computation may be reduced to increase the computing speed. In order to accommodate such circumstances, all of the four antennas provided in the radar device may not be selected for transmission but, for example, only the antennas A1 and A2 may be selected for transmission to obtain five channels or, alternatively, the antennas A1, A2 and A3 may be selected for transmission to obtain nine channels. Thus, by selecting any of the antennas for transmission appropriately, the number of channels may be changed depending on the control of the switch SW while the four antennas are still provided.

Further, though the embodiment in which the radar device is provided with the four antennas used for both transmission and reception has been described heretofore, in order to obtain an appropriate number of channels, all of the four antennas may not be used for both transmission and reception but only two or three of the four antennas may be used for both transmission and reception. Still further, if it is desired to increase the number of channels especially, an antenna A5 (not shown) may be added at the midpoint between two antennas that are separated from each other by the distance 2 d.

As described above, in the configuration of the radar device according to this embodiment shown in FIG. 1, among a plurality of antennas aligned on an identical plane and in an identical straight line, an electric wave is transmitted from at least one or more selected antennas and reflected waves resulted from the electric wave are received by each of the antennas. Therefore, by using the antennas the number of which is less than that in the conventional radar device, a larger number of channels can be obtained and, at the same time, the size and cost of the radar device can be reduced. In particular, if all of the plurality of antennas are used for both transmission and reception, the number of channels can be increased significantly and the directivity can be improved when the received signals are combined, which will result in improvement of the performance of the radar device.

Next, variations of this embodiment to improve the efficiency, reduce the cost or achieve further downsizing based on the configuration of the radar device according to this embodiment shown in FIG. 1 will be described with reference to FIGS. 5–11.

Figure 5:
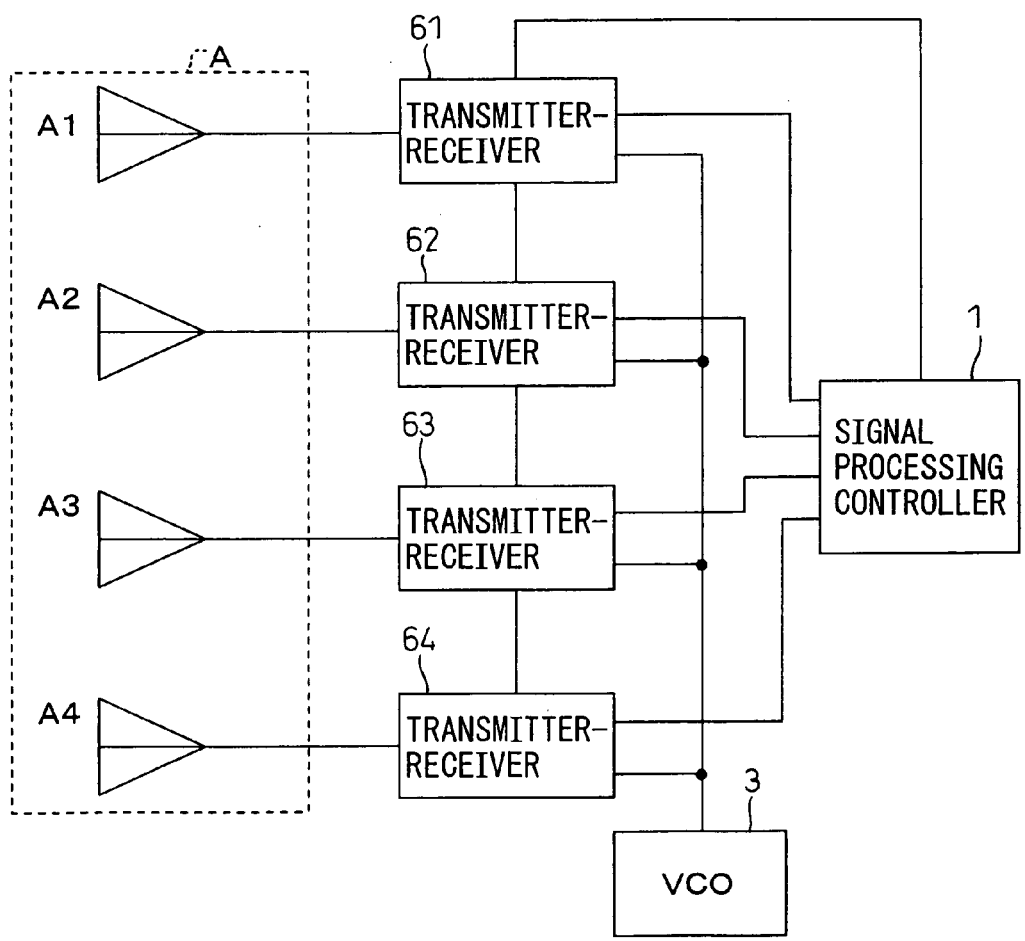
FIG. 5 is a diagram for describing a first variation of the antenna transmitting and receiving mode in the radar device of this embodiment.

In a first variation of FIG. 5, the switching means is omitted and the four antennas A1, A2, A3 and A4 are connected respectively to corresponding transceiver 61, 62, 63 and 64, each of which has functions of both the transmitter 2 and the receiver 4. This configuration is effective when it is desirable to prevent signals from being attenuated regardless of increased cost. Each of the transceivers may be provided with respective voltage-controlled oscillators (VCO) for generating transmitted signals separately but, in the shown example, only one voltage-controlled oscillator 3 shared by all transceivers is provided as one common transmitted signal source so as to facilitate synchronization of receiving operations while the cost can be reduced. Transmission/reception sharing means for switching the antennas between transmission and reception may be, for example, a hybrid circuit or a distribution circuit and, moreover, amplifiers (AMP) and/or attenuators (ATT) may be inserted at the transmitting and receiving sides so as to turn on or off the transmission and reception by the gain control and/or attenuation control, respectively. This allows switching between transmission and reception in a time division manner.

Figure 6:
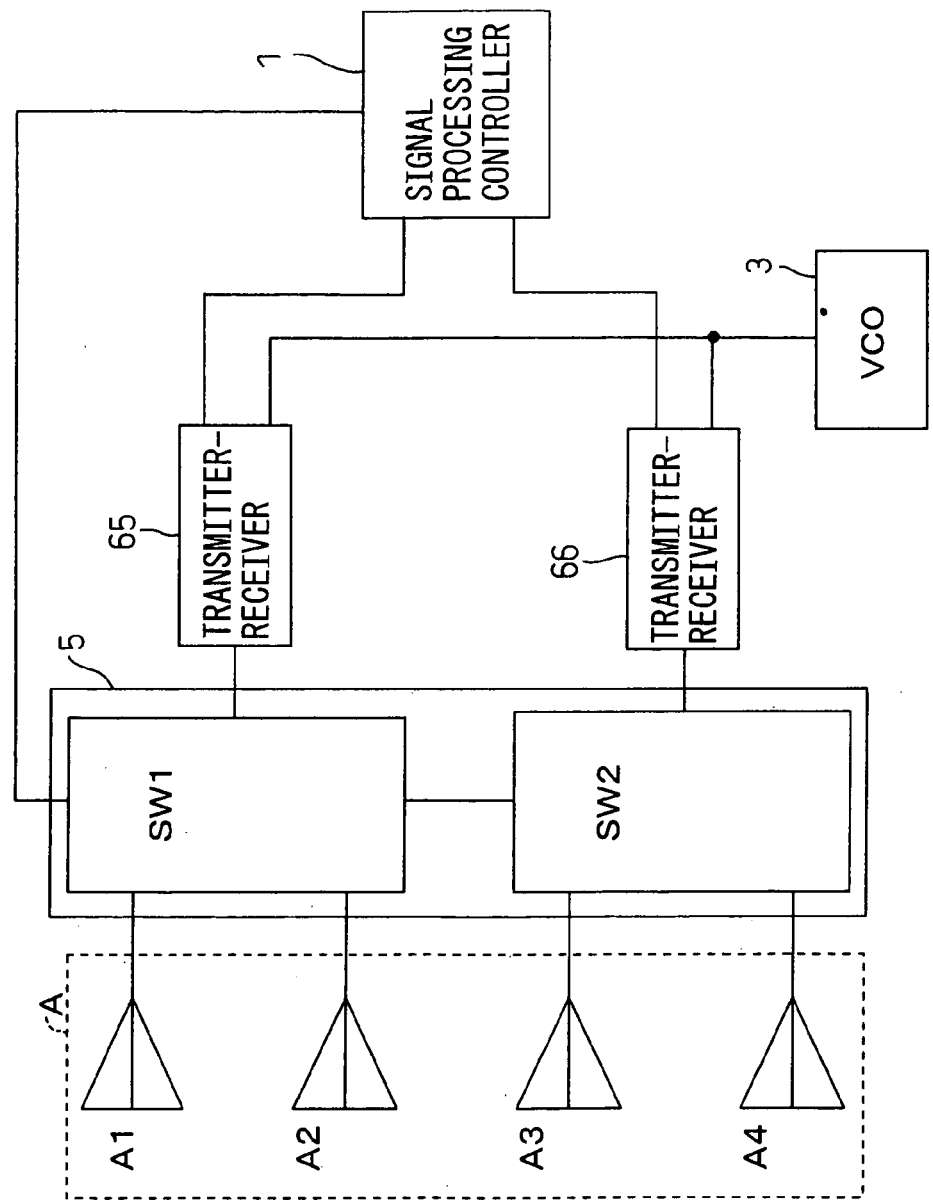
FIG. 6 is a diagram for describing a second variation of the antenna transmitting and receiving mode in the radar device of this embodiment.

In a second variation of FIG. 6, there is shown an exemplary configuration that is intermediate between the configuration shown in FIG. 1 and the configuration shown in FIG. 5 so as to reduce signal attenuation to a relatively low level along with the cost of the transceivers. To this end, in contrast to the configuration of FIG. 5 in which the switching means 5 is omitted, in the configuration of FIG. 6, two switches SW1 and SW2, each of which has one input and two switched outputs (SPDT), are provided and controlled by the signal processing controller 1 to switch between the four antennas. Also in this case, the voltage-controlled oscillator is shared by the transceivers 65 and 66.

While the variations of the configurations of the transmitters and receivers of this embodiment have been described heretofore, next, specific examples of the switching means 5 in the radar device of FIG. 1 will be described hereinafter. In the figures, it is to be noted that the signal processing controller 1 and the voltage-controlled oscillator 3 are not shown in order to focus on the switching means 5. The four antennas A1, A2, A3 and A4 forming the antenna array A, the transmitter 2 and the receiver 4 are connected to the switching means 5 and the switch SW is switched according to the control by the signal processing controller 1 so that the transmission and reception by the four antennas are controlled in a time division manner.

Figure 7:
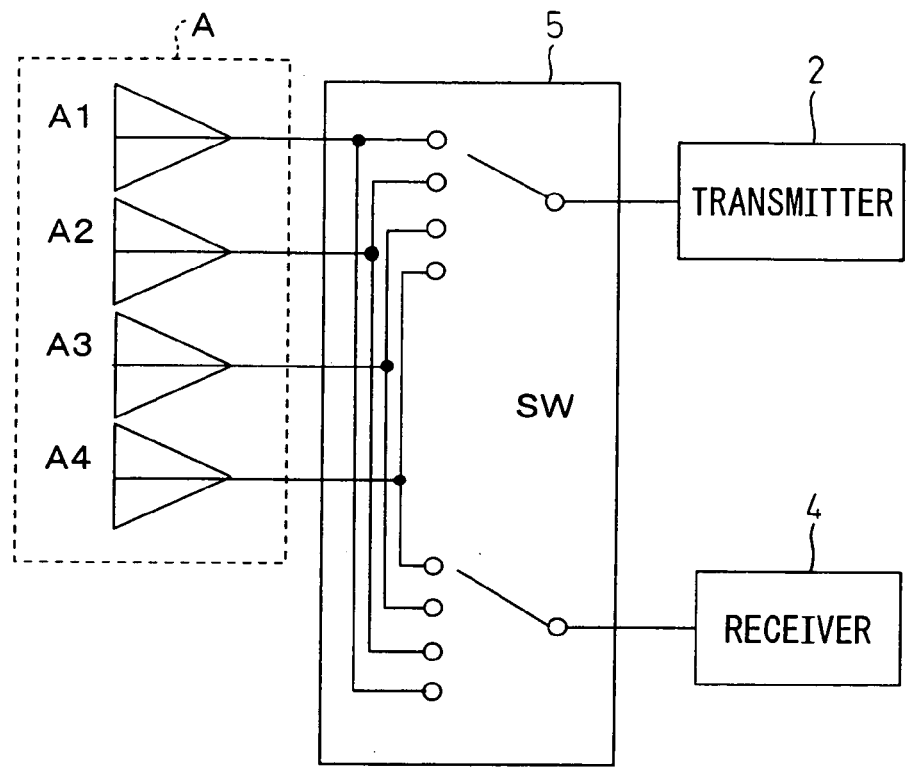
FIG. 7 is a diagram for describing a first specific example of antenna switching in the radar device of this embodiment.

In a first specific example shown in FIG. 7, each of the four antennas A1, A2, A3 and A4 is provided with transmitting and receiving ports so that each antenna can be connected to the transmitters 2 or the receiver 4 in a time division manner.

Figure 8:
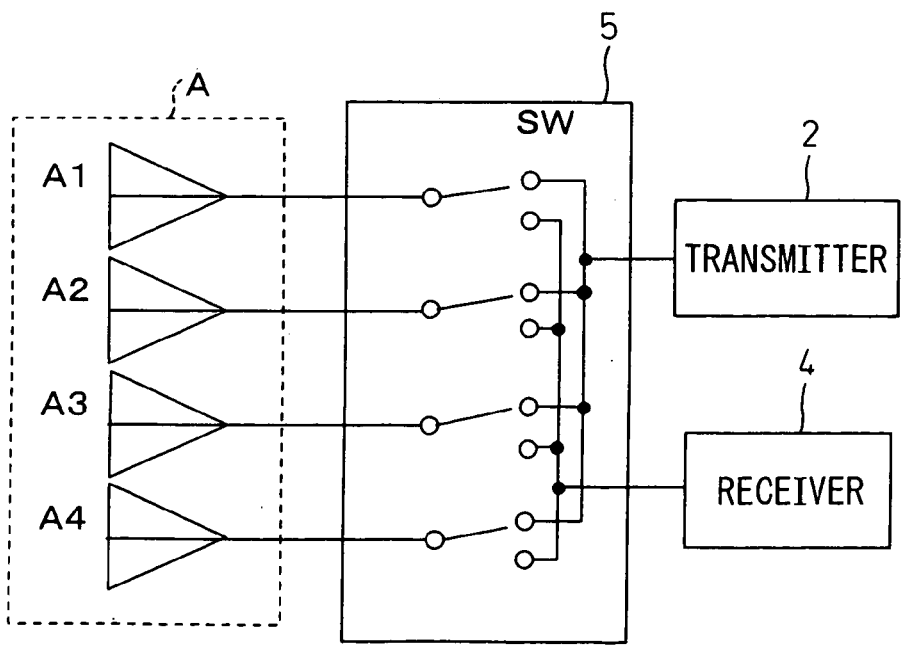
FIG. 8 is a diagram for describing a second specific example of antenna switching in the radar device of this embodiment.

In a second specific example shown in FIG. 8, in contrast to the first specific example, each of the transmitter 2 and the receiver 4 is provided with ports for connecting to the four antennas A1, A2, A3 and A4. It also allows connection between each antenna and the transmitter 2 or the receiver 4 in a time division manner.

Figure 9:
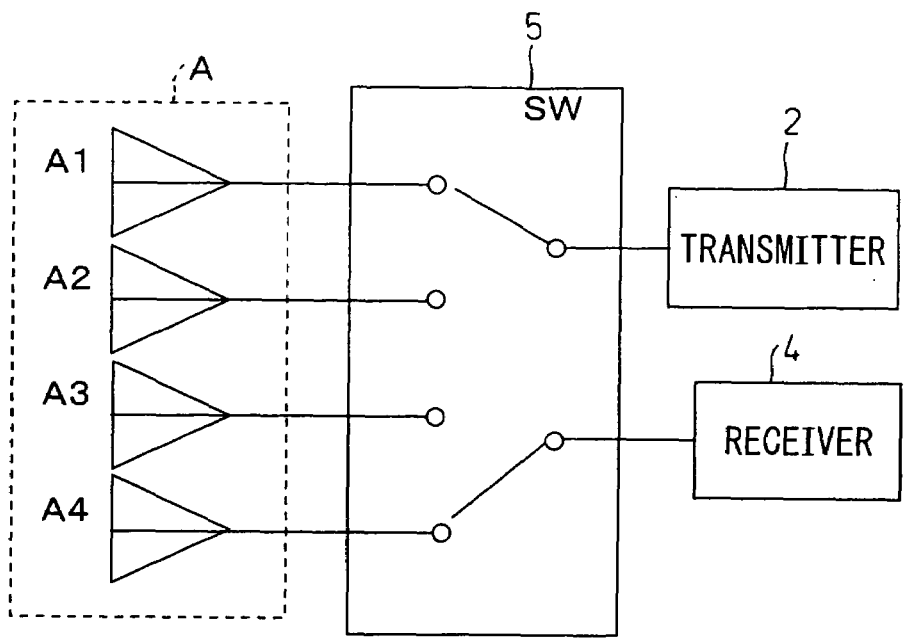
FIG. 9 is a diagram for describing a third specific example of antenna switching in the radar device of this embodiment.

In a third specific example shown in FIG. 9, each of the four antennas A1, A2, A3 and A4 has one port so that the transmitter 2 or the receiver 4 can selectively switch between the four antennas. It also allows connection between each antenna and the transmitter 2 or the receiver 4 in a time division manner.

Figure 10:
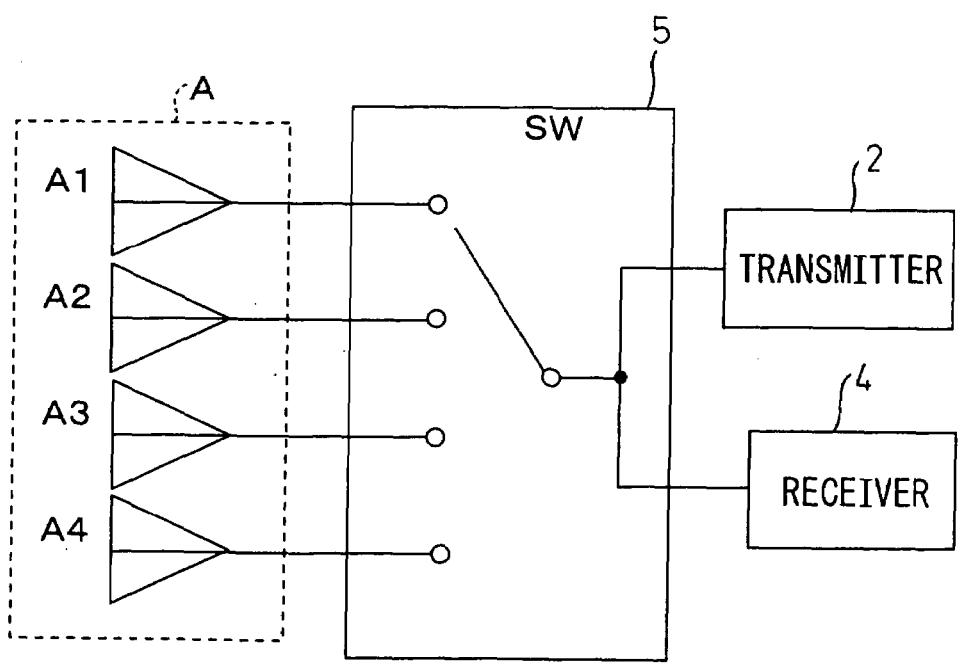
FIG. 10 is a diagram for describing a fourth specific example of antenna switching in the radar device of this embodiment.

Further, in contrast to the third specific example, in which the transmitter 2 and the receiver 4 can selectively switch the antennas in an independent manner, in a fourth specific example shown in FIG. 10, the transmission/reception sharing means is provided within the switching means 5 so as to allow connection between each antenna and the transmitter 2 or the receiver 4 in a time division manner. The transmission/reception sharing means may be a hybrid circuit or a distribution circuit, which allows the circuit to be configured at low cost.

Figure 11:
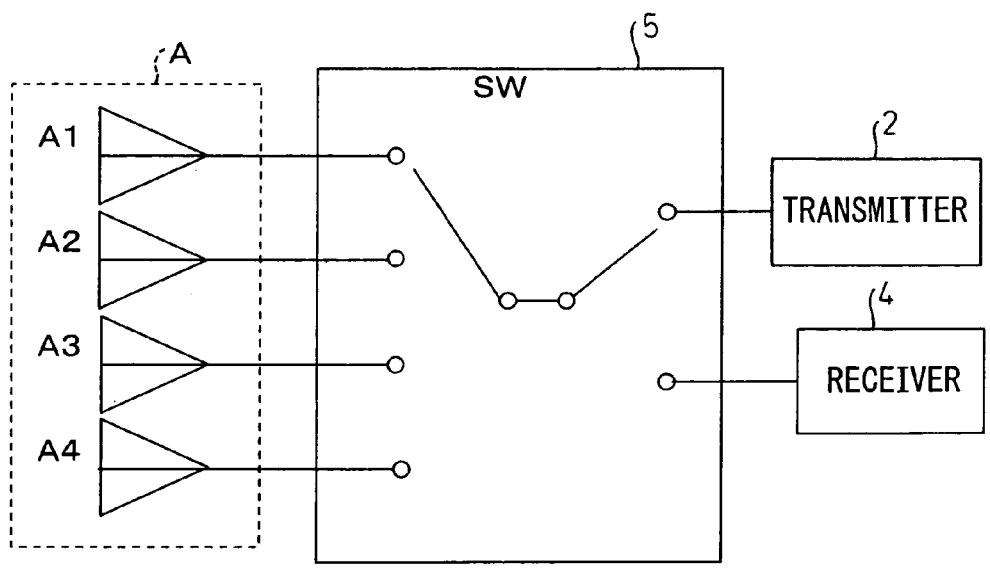
FIG. 11 is a diagram for describing a fifth specific example of antenna switching in the radar device of this embodiment.

In a fifth specific example shown in FIG. 11, the transmission/reception sharing means in the fourth specific example is comprised of a switch having one input and two outputs, which also allows connection between each antenna and the transmitter 2 or the receiver 4 in a time division manner.

Further, in the first to fifth specific examples, if the switch SW in the switching means 5 is a two-way switch that can be used for both transmission and reception, the switching means 5 can be downsized.

As described above, in the radar device of the present invention, among a plurality of antennas aligned on an identical plane and in an identical straight line, an electric wave is transmitted from at least one or more selected antennas and reflected waves resulted from the electric wave are received by each of the antennas. Therefore, even by using the antennas the number of which is less than that in the conventional radar device, a larger number of channels can be obtained and, at the same time, the size and cost of the radar device can be reduced. If all of the plurality of antennas are used for both transmission and reception, the number of channels can be increased significantly and the directivity can be improved when the received signals are combined, which will result in improvement of the performance of the radar device.

Further, the number of antennas disposed in the radar device of the present invention can be less than that in the conventional radar device and, moreover, spacing between adjacent antennas when a plurality of antennas are disposed is improved. As a result, digital multi-beam forming in a multi-channel environment can be implemented and, further, the size and cost of the device can be reduced.

As the radar device configured as described herein can be fabricated easily with lower cost, in an application such as a collision-avoidance system mounted on a car and the like, it has an advantage in that the entire radar device can be shaped so that it is suitable for being mounted on a vehicle.

What is claimed is:

1. A radar device comprising:
   a plurality of antennas disposed in a single row, each antenna being used for both a transmit antenna and a receive antenna and at least one pair of adjacent antennas of the plurality of antennas having a different distance between the at least one pair of adjacent antennas than a distance between one or more other pair of adjacent antennas,
   a signal processing unit receiving reflected waves resulting from a transmitted electric wave and performing digital multi-beam forming based on a received signal;
   a transmitter for transmitting said electric wave from at least one or more antennas selected from said plurality of antennas; and
   a receiver for receiving said reflected waves via each of said plurality of antennas.

2. A radar device according to claim 1, further comprising:
   a first switch for supplying a transmitted signal of said electric wave from said transmitter to said selected antenna; and
   a second switch for switching and inputting received signals according to said reflected electric waves received by each of said antennas to said receiver sequentially.

3. A radar device according to claim 1, wherein said plurality of antennas have identical antenna characteristics.

4. A radar device according to claim 2, wherein said first switch switches said plurality of antennas sequentially every cycle of said transmitted signal.

5. A radar device according to claim 4, wherein, when one particular antenna is selected by said first switch and the electric wave is transmitted from the selected particular antenna, said second switch selects any of said antennas for receiving the reflected waves resulted from the selected particular electric wave and inputs said received signal to said receiver.

6. A radar device according to claim 5, wherein, when a receiving channel in relation to the reflected waves according to the electric wave transmitted by the selected particular antenna and a receiving channel in relation to the reflected waves according to the electric wave transmitted by any antenna different from the selected particular antenna overlap each other, said second switch does not select reception of the particular antenna.

7. A radar device according to claim 5, wherein, when a receiving channel in relation to the reflected waves according to the electric wave transmitted by the selected particular antenna and a receiving channel in relation to the reflected waves according to the electric wave transmitted by any antenna different from the selected particular antenna overlap each other, said receiver does not provide its output to said digital multi-beam forming means.

8. A radar device according to claim 6, wherein said plurality of antennas are disposed so that the ratio of a distance between a given pair of adjacent antennas to a distance between another pair of adjacent antennas is 1:2.

9. A radar device according to claim 8, wherein said plurality of antennas include first to fourth antennas that are arranged sequentially, wherein
   a pair of said first and second antennas are disposed with a first distance and a pair of said second and third antennas and a pair of said third and fourth antennas are each disposed with a second distance, and
   said second distance is twice as long as said first distance.

10. A radar device according to claim 5, wherein said plurality of antennas are provided with respective transmitting ports and receiving ports, wherein each of said transmitting ports is connected to respective transmitters and each of said receiving ports is connected to respective receivers.

11. A radar device according to claim 10, wherein each of said transmitting ports is connected to a shared transmitter selectively and each of said receiving ports is connected to a shared receiver selectively.

12. A radar device according to claim 1, wherein each of said plurality of antennas is connected to a transmitting port and a receiving port of a two-way switch for switching between transmission and reception,
   wherein said two-way switch connects the respective antenna to the transmitter when it is switched for said transmission and connects the respective antenna to the receiver when it is switched for said reception.

13. A radar device comprising
   a plurality of antennas disposed in a single row, each antenna being used for both a transmit antenna and a receive antenna and at least one pair of adjacent antennas of the plurality of antennas having a different distance between the at least one pair of adjacent antennas than a distance between one or more other pair of adjacent antennas;

a signal processing unit receiving reflected waves resulting from a transmitted electric wave and performing digital multi-beam forming based on a received signal; and transceivers corresponding to each of said plurality of antennas, each transceiver having a respective output port for both transmission and reception, each of the output ports of the transceivers being connected to a respective antenna.

14. A radar device comprising:

a plurality of antennas disposed in a single row, each antenna being used for both a transmit antenna and a receive antenna and at least one pair of adjacent antennas of the plurality of antennas having a different distance between the at least one pair of adjacent antennas than a distance between one or more other pair of adjacent antennas;

a signal processing unit receiving reflected waves resulting from a transmitted electric wave and performing digital multi-beam forming based on a received signal; and a pair of transceivers, each of the pair of transceivers being coupled to a respective pair of antennas through a respective switch, wherein each of said transceivers are selectively connected to each respective pair of antennas for transmission or reception.

15. A radar device according to claim 14, wherein the pair of transceivers share a voltage controlled oscillator.

16. A radar device according to claim 13, wherein said transceivers are connected to said antennas and switched to transmission or reception in a time division manner.

17. A radar device according to claim 10, further comprising a voltage-controlled oscillator for supplying a reference signal to said transmitters and said receivers, wherein said voltage-controlled oscillator is shared by each transmitter and each receiver in relation to said plurality of antennas.

* * * * *

UNITED STATES PATENT AND TRADEMARK OFFICE
CERTIFICATE OF CORRECTION

PATENT NO. : 7,173,561 B2  Page 1 of 1
APPLICATION NO. : 10/778517
DATED : February 6, 2007
INVENTOR(S) : Isaji It is certified that error appears in the above-identified patent and that said Letters Patent is hereby corrected as shown below:

In the Claims

Column 14, line 14, Claim 5      Delete "resulted",
                                             Insert --resulting--

Column 14, line 63, Claim 13      After "comprising",
                                             Insert --:--

Column 16, line 4, Claim 14      Delete "are",
                                             Insert --is--

Signed and Sealed this

Fourth Day of December, 2007

JON W. DUDAS
*Director of the United States Patent and Trademark Office*